United States Patent
Schreiber et al.

(10) Patent No.: US 6,938,747 B2
(45) Date of Patent: Sep. 6, 2005

(54) TRANSMISSION WITH A RATTLE-FREE CONNECTION BETWEEN THE CLUTCH BASKET AND THE DRIVING DISC

(75) Inventors: Wolfgang Schreiber, Isenbüttel (DE); Ingo Steinberg, Calberlah (DE)

(73) Assignee: Volkswagen AG, Wolfsburg (DE)

( * ) Notice: Subject to any disclaimer, the term of this patent is extended or adjusted under 35 U.S.C. 154(b) by 4 days.

(21) Appl. No.: 10/685,063

(22) Filed: Oct. 14, 2003

(65) Prior Publication Data

US 2004/0084274 A1 May 6, 2004

Related U.S. Application Data

(63) Continuation of application No. PCT/EP02/03963, filed on Apr. 10, 2002.

(30) Foreign Application Priority Data

Apr. 11, 2001 (DE) .......................................... 101 18 233

(51) Int. Cl.[7] .......................... F16D 13/62; F16H 55/16
(52) U.S. Cl. ......................... 192/70.2; 74/409; 74/443; 403/359.2
(58) Field of Search ............................. 192/70.2, 70.17; 74/461, 462, 409, 437, 440, 443, 446, 447, 449; 403/359.2, 359.6; 29/274

(56) References Cited

U.S. PATENT DOCUMENTS

| | | | | |
|---|---|---|---|---|
| 1,467,732 A | * | 9/1923 | Litle, Jr. ............... | 192/70.2 |
| 2,335,504 A | * | 11/1943 | Gazda .................. | 74/409 |
| 4,640,294 A | | 2/1987 | Ordo | |
| 5,924,928 A | * | 7/1999 | Stegman et al. ........ | 464/73 |

FOREIGN PATENT DOCUMENTS

| | | | |
|---|---|---|---|
| GB | 2 275 318 A | * | 8/1994 |
| JP | 2-62410 A | * | 3/1990 |
| JP | 7-259884 A | * | 10/1995 |
| JP | 08061384 A | | 3/1996 |

* cited by examiner

Primary Examiner—Rodney H. Bonck
(74) Attorney, Agent, or Firm—Laurence A. Greenberg; Werner H. Stemer; Manfred Beck

(57) ABSTRACT

A transmission includes a clutch basket and a driving disc each having teeth and tooth spaces which correspond to one another. A plug-in intermeshing connection between the driving disc and the clutch basket is provided such that there is no torsional backlash and such that no rattling noises are produced. To this end, at least one of the teeth of the driving disc and/or at least one of the teeth of the clutch basked has a slot. The tooth thickness of at least one of the teeth of the driving disc is greater than at least one of the tooth space widths of the clutch basket. In order to avoid rattling noises, it is also suggested that at least one pair formed of a tooth and a corresponding opposite tooth space may be configured such that the tooth is displaced with respect to the corresponding tooth space.

8 Claims, 3 Drawing Sheets

TRANSMISSION WITH A RATTLE-FREE CONNECTION BETWEEN THE CLUTCH BASKET AND THE DRIVING DISC

CROSS-REFERENCE TO RELATED APPLICATION

This application is a continuation of copending International Application No. PCT/EP02/03963, filed Apr. 10, 2002, which designated the United States and was not published in English.

BACKGROUND OF THE INVENTION

Field of the Invention

The invention relates to a transmission with a rattle-free connection between a clutch basket and a driving disc. The driving disc has teeth and tooth spaces on its outer circumference which form a plug-type intermeshing with corresponding tooth spaces and teeth in the clutch basket.

Connections of this kind between the driving disc, which is drive-operatively connected to a transmission input shaft, and the clutch basket of the transmission, the clutch basket carrying, for example, the friction linings, are generally known from the prior art. The teeth and the tooth spaces of the driving disc and of the clutch basket are in this case normally paired in such a way that the driving disc can be plugged or inserted into the clutch basket with slight play during the assembly of the transmission.

Since, in particular, diesel engines, but also engines such as those with a small number of cylinders have rotational speed irregularities, particularly in the case of low engine rotational speeds and a low engine torque, the circumferential play which is advantageous for assembling the driving disc and clutch basket leads to adverse rattling noises and wear phenomena on the teeth of the driving disc and the clutch basket.

To avoid these disadvantages it is known from the prior art to harden the tooth flanks of the teeth of the driving disc and/or of the clutch basket by nitriding in order thereby to increase the wear resistance. Moreover, an excessive and therefore disadvantageous tooth flank play can be reduced by selecting pairings of driving discs and clutch baskets in which the plug-type intermeshing described above leads to as small a tooth flank play as possible.

These known measures for reducing the tooth flank play and consequently for avoiding rattling vibrations in this portion of the transmission are comparatively costly and complicated.

SUMMARY OF THE INVENTION

It is accordingly an object of the invention to provide a transmission which overcomes the above-mentioned disadvantages of the heretofore-known transmissions of this general type and which provides a cost-effective intermeshing connection between a driving disc and a clutch basket such that the transmission rattling described above will be reliably prevented.

With the foregoing and other objects in view there is provided, in accordance with the invention, a transmission, including:

a driving disc and a clutch basket;

the driving disc and the clutch basket each having an outer circumference, each of the driving disc and the clutch basket having teeth on the outer circumference and each of the driving disc and the clutch basket having tooth spaces formed on the outer circumference;

the driving disc and the clutch basket being configured such that the teeth and the tooth spaces of the clutch basket correspond to the tooth spaces and the teeth of the driving disc and such that the driving disc can be axially plugged into the clutch basket for providing a plug-in intermeshing;

at least one tooth selected from the group consisting of one of the teeth of the driving disc and one of the teeth of the clutch basket having an axially oriented slot formed therein; and the tooth spaces of the clutch basket defining respective tooth space widths, at least one of the teeth of the driving disc having a tooth thickness greater than at least one of the tooth space widths of the tooth spaces of the clutch basket for providing a rattle-free connection between the clutch basket and the driving disc.

In other words, according to the invention, there is provided, a transmission with a rattle-free connection between the clutch basket and driving disc, wherein the driving disc has teeth and tooth spaces on its outer circumference, wherein the clutch basket has on its outer circumference teeth and tooth spaces corresponding to the teeth and tooth spaces of the driving disc, and wherein the driving disc can be plugged axially into the clutch basket with the effect of a plug-type intermeshing, wherein at least one of the teeth of the driving disc and/or at least one of the teeth of the clutch basket have axially oriented slots and wherein the tooth thickness of at least one of the teeth of the driving disc is greater than at least one of the tooth space widths of the clutch basket.

Accordingly, it is therefore proposed to provide at least one of the teeth of the driving disc and/or at least one of the teeth of the clutch basket with axially oriented slots. Slots of this type are likewise expedient in the tooth spaces of the clutch basket.

These slots result, in the region of the plug-type intermeshing between the driving disc and the clutch basket, in a deliberate weakening of the material in the circumferential direction. As a result of this material weakening the teeth or tooth spaces are to some degree flexurally softer than without this slot. The introduction of the driving disc into the toothing of the clutch basket leads, in the case of an oversize in the tooth width of at least one of the teeth of the driving disc or clutch basket, to an expansion or a compression of the adjacent intermeshing partner (for example, a tooth space in the clutch basket). The driving disc introduced, free of play, into the clutch basket in this way is thereby seated firmly in a plug-type intermeshing, in such a way that movement of the two components in relation to one another is no longer possible. A rattle-free connection between the driving disc and the clutch basket is thereby achieved in a highly advantageous way.

According to another feature of the invention, at least one of the tooth spaces of the clutch basket has a slot formed therein.

According to yet another feature of the invention, at least one of the tooth spaces of the clutch basket has an end face with an introduction slope and/or at least one of the teeth of the driving disc has an end face with an introduction slope.

With the objects of the invention in view there is also provided, a transmission, including:

a driving disc and a clutch basket;

the driving disc and the clutch basket each having an outer circumference, each of the driving disc and the clutch basket having teeth on the outer circumference and each of the driving disc and the clutch basket having tooth spaces formed on the outer circumference;

the driving disc and the clutch basket being configured such that the driving disc can be axially plugged into the clutch basket for providing a plug-in intermeshing;

the teeth and the tooth spaces of the clutch basket corresponding to the tooth spaces and the teeth of the driving disc such that pairs are formed, each of the pairs including one of the teeth of the driving disc or the clutch basket and a corresponding one of the tooth spaces of the clutch basket or the driving disc; and one of the teeth located on the outer circumference of the driving disc or on the outer circumferences of the clutch basket being displaced circumferentially in a given direction with respect to a corresponding one of the tooth spaces on the outer circumference of the clutch basket or on the outer circumference of the driving disc for providing a rattle-free connection between the clutch basket and the driving disc.

In other words, according to the invention, there is also provided, a transmission with a rattle-free connection between the clutch basket and the driving disc, wherein the driving disc has teeth and tooth spaces on its outer circumference, wherein the clutch basket has on its outer circumference teeth and tooth spaces corresponding to the teeth and tooth spaces of the driving disc, and in which the driving disc can be plugged axially into the clutch basket with the effect of a plug-type intermeshing, wherein, in the case of at least one pair of a corresponding tooth and tooth space, in which case the tooth may be located on the outer circumference of the driving disc or of the clutch basket, the tooth is displaced circumferentially in a first direction or given direction with respect to the tooth space.

According to another feature of the invention, a further one of the teeth located on the outer circumference of the driving disc or on the outer circumferences of the clutch basket is displaced circumferentially in a direction opposite the given direction with respect to a corresponding one of the tooth spaces on the outer circumference of the clutch basket or on the outer circumference of the driving disc. In other words, for at least one further pair of a corresponding tooth and tooth space, in which case the tooth may be located on the outer circumference of the driving disc or of the clutch basket, the tooth is displaced circumferentially in the direction opposite to the first direction with respect to the tooth space.

According to yet another feature of the invention, both, the one of the teeth displaced circumferentially in the given direction and the further one of the teeth displaced circumferentially in a direction opposite the given direction are located on the outer circumference of the driving disc or the clutch basket. In other words, at least one tooth displaced circumferentially in the first direction with respect to the corresponding tooth space and the at least one further tooth displaced circumferentially in the direction opposite to the first direction with respect to the corresponding tooth space are both located on the outer circumference of the driving disc or of the clutch basket.

According to a further feature of the invention, a first plurality of the teeth located on the outer circumference of the driving disc is displaced circumferentially in the given direction with respect to corresponding ones of the tooth spaces located on the outer circumference of the clutch basket; and a second plurality of the teeth located on the outer circumference of the driving disc is displaced circumferentially in a direction opposite the given direction with respect to corresponding ones of the tooth spaces on the outer circumference of the clutch basket. In other words, a plurality of teeth displaced circumferentially in the first direction with respect to the corresponding tooth spaces of the clutch basket and a plurality of further teeth displaced circumferentially in the direction opposite to the first direction with respect to the corresponding tooth spaces of the clutch basket are located on the outer circumference of the driving disc. Preferably, at least two teeth are displaced in opposite directions.

The displacement of the at least one tooth with respect to its corresponding tooth space has the result that, when the driving disc and the clutch basket are plugged together or inserted into one another by the plug-type intermeshing, a bracing of the teeth and tooth spaces of the driving disc and clutch basket in relation to one another occurs. Consequently, here too, there is, between the driving disc and the clutch basket, a firm plug-type intermeshing, in which a movement of the two components in relation to one another is no longer possible. In the case of such a plug-type intermeshing, both the overrun flank (coast side) and the traction flank (drive side) of the clutch basket are subjected to load.

The teeth displaced with respect to the corresponding tooth spaces may be located on the outer circumference of the driving disc or the clutch basket or on the outer circumference of both components. Preferably, however, the displacement will be provided only on the outer circumference of one component, in which case it is particularly preferred to displace a plurality of teeth circumferentially in both directions in each case. The strength of the plug-type intermeshing is thereby increased.

For an easier introduction of the driving disc into the clutch basket, the end faces of at least one clutch basket tooth and/or of at least one driving disc tooth may advantageously have introduction slopes or chamfers.

Other features which are considered as characteristic for the invention are set forth in the appended claims.

Although the invention is illustrated and described herein as embodied in a transmission with a rattle-free connection between the clutch basket and the driving disc, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
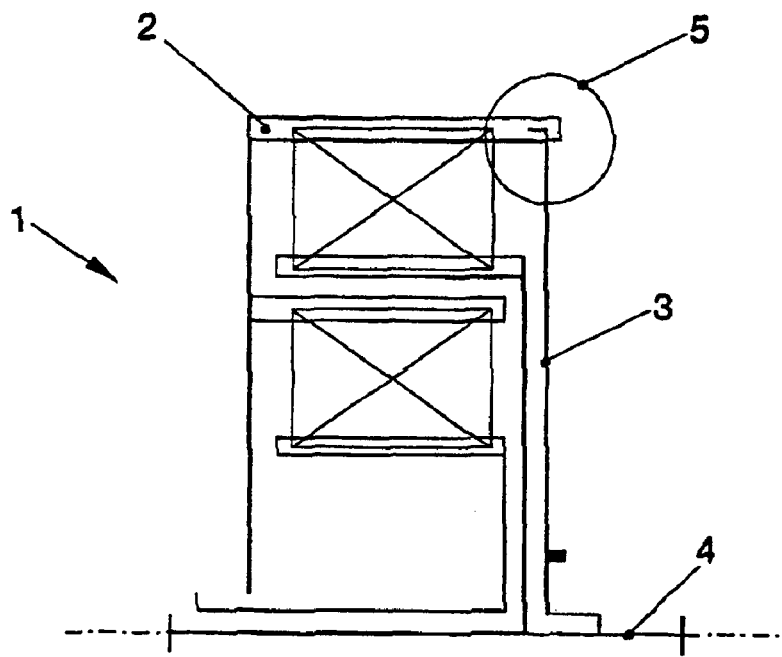
FIG. 1 is a diagrammatic sectional view of a twin clutch transmission and illustrates a vertical section at the clutch basket.

Referring now to the figures of the drawings in detail and first, particularly, to FIG. 1 thereof, there is partially shown a twin clutch transmission wherein reference numeral 1 indicates the part of a twin clutch transmission in which the clutch basket 2 is operatively connected to the driving disc 3 for the purpose of driving such that they are rotationally fixed with respect to one another. The driving disc 3, in turn, is seated fixedly in terms of rotation and drive-operatively on a transmission input shaft 4 which is driven by a crankshaft of an engine. The clutch basket 2 itself serves in a conventional way as a carrier for the friction linings of the two clutches of the twin clutch transmission.

Figure 2:
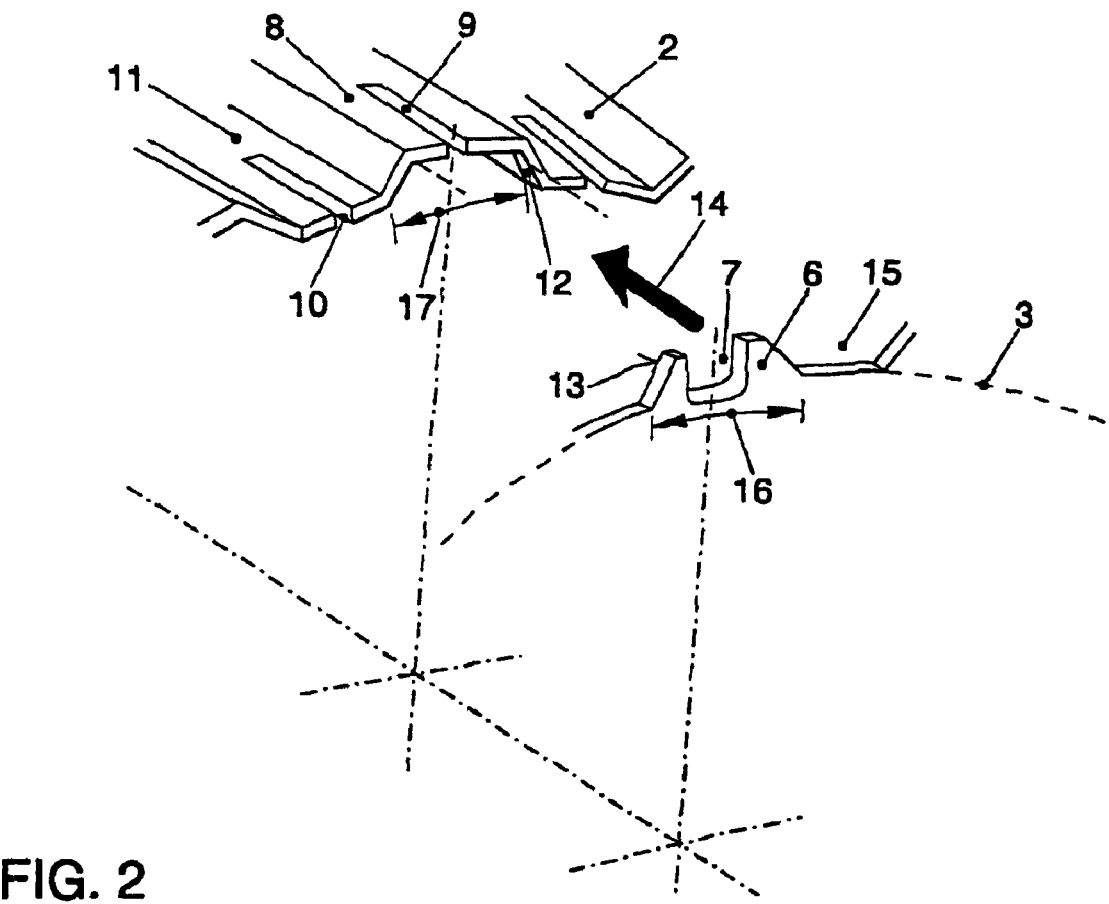
FIG. 2 is a diagrammatic three-dimensional partial view of a driving disc and a clutch basket before they are brought together according an embodiment of the invention.

The drive-operative connection between the driving disc 3 and the clutch basket 2 occurs in the region indicated by the circle 5, through the use of a plug-type or spline-type intermeshing which is shown in a diagrammatic perspective illustration in FIG. 2.

In FIG. 2, the clutch basket 2 can be seen, the connection region of which is provided with teeth 11 and tooth spaces or tooth gaps 8. Teeth 6 and tooth spaces 15 of the driving disc 3, which is to be pushed into the clutch basket 2 in the direction of the arrow 14 in order to achieve the desired plug-type connection, can engage into the intermeshing region formed by the teeth 11 and the tooth spaces 8 of the clutch basket 2.

To achieve the desired rattle-free, that is to say rotary play-free, plug-type intermeshing connection between the driving disc 3 and the clutch basket 2, there is provision for at least one of the teeth 6 of the driving disc 3 to have a radially outward-opening and axially oriented slot 7 which results in a reduction in the flexural rigidity of the right-side and left-side regions of the tooth 6 of the driving disc 3, the effects of the reduction being exactly defined beforehand.

Such a deliberate reduction in the flexural rigidity of the teeth 11 or tooth spaces 8 may also be implemented on the clutch basket 2. As may be gathered clearly from FIG. 2, alternatively or additionally to the teeth 6 of the driving disc, the teeth 11 or the tooth spaces 8 may also be provided with slots 9, 10 which lead to the deliberate material weakening in the region of the plug-type intermeshing between the driving disc and the clutch basket.

In addition to the slots, the tooth thickness or tooth width 16 of at least one of the teeth 6 of the driving disc 3 is greater than the tooth space width 17 of the driving disc 2, so that, with a press-in force being applied, the driving disc 3 can be pushed firmly into the clutch basket in such a way that this leads to an expansion of the tooth spaces 8 in the region of the slot 9 or to a compression of the teeth 6, 11 in the region of the slots 7 and 10. The normal force or pressure load thus applied to the tooth flanks of the plug-type intermeshing elements leads to a plug-type intermeshing connection which is free of rotary play (backlash-free) and in which the otherwise customary rattling noises are avoided.

In this exemplary embodiment of the invention, for the easier introduction of the driving disc 3 into the clutch basket 2, introduction slopes or chamfers 12, 13 are provided on the end faces of the teeth 6 and of the driving disc 3 and/or on the end faces of the tooth spaces 8 of the clutch basket. These introduction slopes or chamfers 12, 13 may be formed on all the end faces of the intermeshing partners or may only be formed on individual teeth or tooth spaces.

Figure 3:
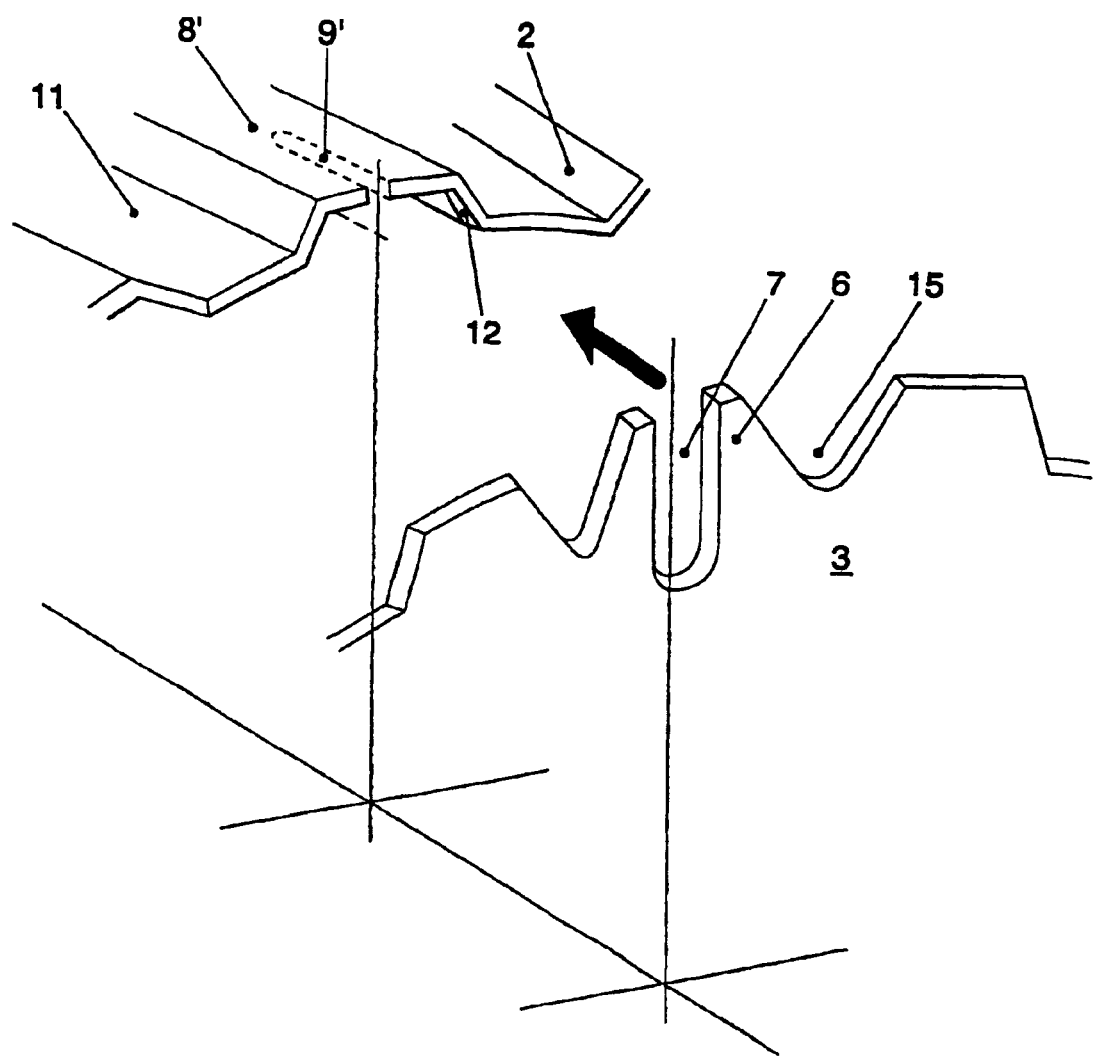
FIG. 3 is a diagrammatic three-dimensional partial view of a driving disc and a clutch basket according a further embodiment of the invention.

In a further embodiment of the invention, according to FIG. 3, there may be provision for only individual teeth or only one individual tooth 6 of the driving disc 3 to have a slot 7, while the teeth 11 and tooth spaces 8 of the clutch basket 2 have no such slots. There may, however, also be provision for only one individual tooth 6 of the driving disc 3 and the opposite tooth space 8' to have such a slot 7, 9'.

Figure 4:
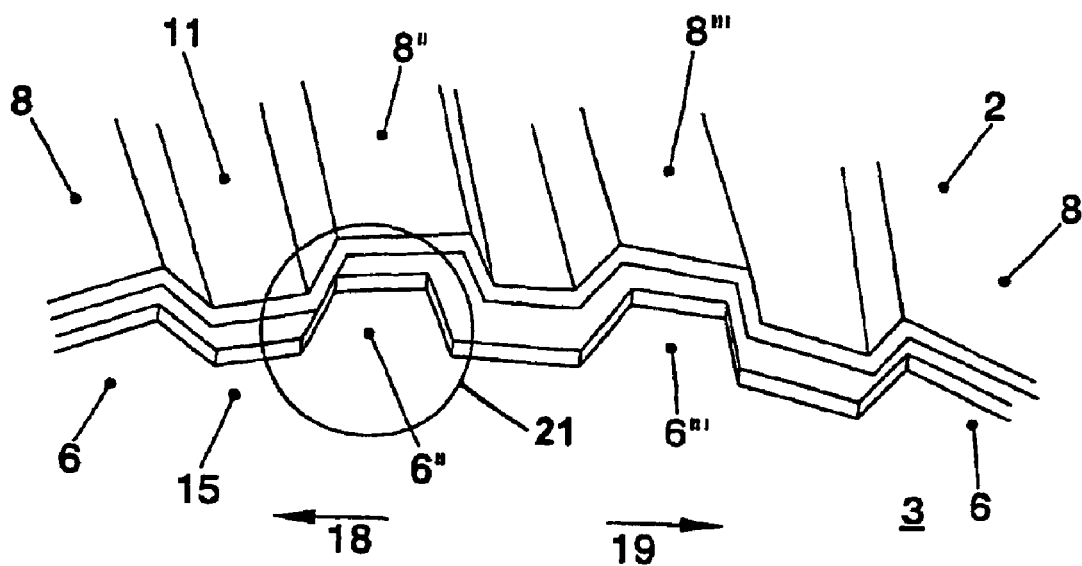
FIG. 4 is a diagrammatic three-dimensional partial view of a driving disc and a clutch basket before they are brought together, wherein two teeth are displaced with respect to the corresponding tooth spaces.
Figure 5:
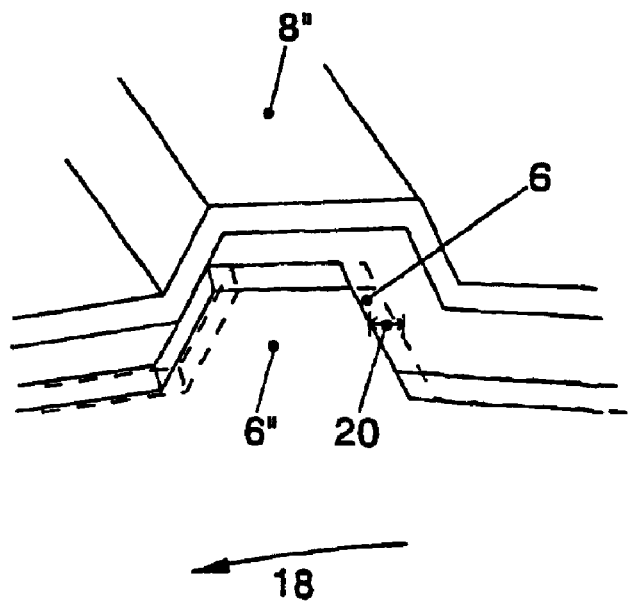
FIG. 5 is a detailed three-dimensional view of a displaced tooth according to the invention.

FIG. 4 shows the driving disc 3 and the clutch basket 2 of a transmission according to the invention before they are brought together in a plug-type intermeshing, the teeth 6" and 6"' on the outer circumference of the driving disc 3 being displaced with respect to the corresponding tooth spaces 8" and 8"' on the outer circumference of the clutch basket 2. In this case, the tooth 6" has been displaced circumferentially in the direction 18 and the tooth 6"' circumferentially in the direction 19 which is opposite to the direction 18. The displacement of the tooth 6" is shown in detail in FIG. 5 which shows, enlarged, the detail indicated by the circle 21 in FIG. 4. What is shown here is that the tooth 6" has been displaced by the amount of the length 20 circumferentially in the direction 18 with respect to the position 6 (depicted by broken lines) which corresponds exactly to the position of the corresponding tooth space. As a result of the displacement of the teeth 6" and 6"', when there is the plug-type intermeshing of the driving disc 3 and clutch basket 2, a bracing or tensioning of the teeth 6" and 6"' in relation to the corresponding tooth spaces 8" and 8"' occurs, thus causing a firm plug-type connection between the driving disc 3 and the clutch basket 2 wherein a movement of the two components in relation to one another is no longer possible.

We claim:

1. A transmission, comprising:
   a driving disc and a clutch basket;
   said driving disc and said clutch basket each having an outer circumference, each of said driving disc and said clutch basket having teeth on said outer circumference and each of said driving disc and said clutch basket having tooth spaces formed on said outer circumference;
   said driving disc and said clutch basket being configured such that said teeth and said tooth spaces of said clutch basket correspond to said tooth spaces and said teeth of said driving disc and such that said driving disc can be axially plugged into said clutch basket for providing a plug-in intermeshing;
   at least one tooth selected from the group consisting of one of said teeth of said driving disc and one of said teeth of said clutch basket having an axially oriented slot formed therein;
   said tooth spaces of said clutch basket defining respective tooth space widths, at least one of said teeth of said driving disc having a tooth thickness greater than at least one of said tooth space widths of said tooth spaces of said clutch basket for providing a rattle-free connection between said clutch basket and said driving disc; and
   at least one of said tooth spaces of said clutch basket having a slot formed therein.

2. The transmission according to claim 1, wherein at least one of said tooth spaces of said clutch basket has an end face with an introduction slope.

3. The transmission according to claim 1, wherein at least one of said teeth of said driving disc has an end face with an introduction slope.

4. A transmission, comprising:
   a transmission input shaft;
   a driving disc and a clutch basket;
   said driving disc and said transmission input shaft being connected to one another in a manner fixed against relative rotation;
   said driving disc and said clutch basket each having an outer circumference, each of said driving disc and said clutch basket having teeth on said outer circumference and each of said driving disc and said clutch basket having tooth spaces formed on said outer circumference;

said driving disc and said clutch basket being configured such that said driving disc can be axially plugged into said clutch basket for providing a plug-in intermeshing;

said teeth and said tooth spaces of said clutch basket corresponding to said tooth spaces and said teeth of said driving disc such that pairs are formed, each of said pairs including one of said teeth of said driving disc or said clutch basket and a corresponding one of said tooth spaces of said clutch basket or said driving disc; and one of said teeth located on said outer circumference of said driving disc or on said outer circumferences of said clutch basket being displaced circumferentially in a given direction with respect to a corresponding one of said tooth spaces on said outer circumference of said clutch basket or on said outer circumference of said driving disc for providing a rattle-free connection between said clutch basket and said driving disc.

5. The transmission according to claim 4, wherein a further one of said teeth located on said outer circumference of said driving disc or on said outer circumferences of said clutch basket is displaced circumferentially in a direction opposite the given direction with respect to a corresponding one of said tooth spaces on said outer circumference of said clutch basket or on said outer circumference of said driving disc.

6. The transmission according to claim 5, wherein both, said one of said teeth displaced circumferentially in the given direction and said further one of said teeth displaced circumferentially in a direction opposite the given direction are located on said outer circumference of said driving disc.

7. The transmission according to claim 5, wherein both, said one of said teeth displaced circumferentially in the given direction and said further one of said teeth displaced circumferentially in a direction opposite the given direction are located on said outer circumference of said clutch basket.

8. The transmission according to claim 4, wherein:

a first plurality of said teeth located on said outer circumference of said driving disc is displaced circumferentially in the given direction with respect to corresponding ones of said tooth spaces located on said outer circumference of said clutch basket; and a second plurality of said teeth located on said outer circumference of said driving disc is displaced circumferentially in a direction opposite the given direction with respect to corresponding ones of said tooth spaces on said outer circumference of said clutch basket.

* * * * *